March 17, 1925. 1,530,140
J. SCHNEIBLE
EVAPORATOR
Filed April 16, 1921 2 Sheets-Sheet 1

Inventor
Joseph Schneible,

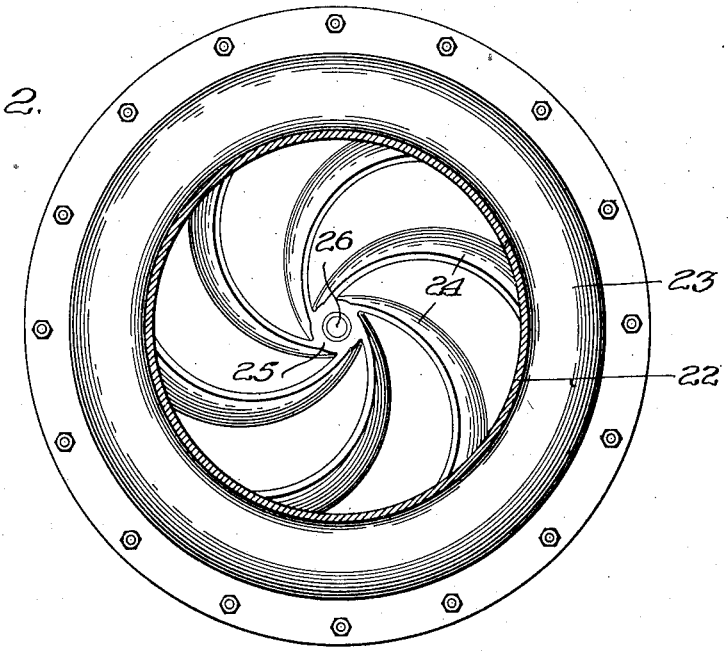
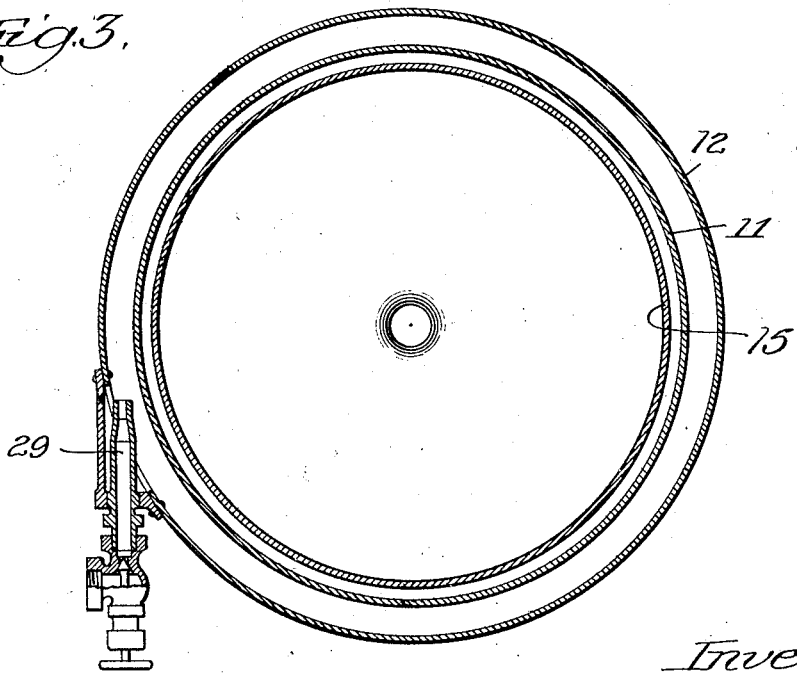

Patented Mar. 17, 1925.

1,530,140

UNITED STATES PATENT OFFICE.

JOSEPH SCHNEIBLE, OF CHICAGO, ILLINOIS; BEATRICE SCHNEIBLE INGRAM, ADMINISTRATRIX OF SAID JOSEPH SCHNEIBLE, DECEASED, ASSIGNOR TO CLAUDE D. SCHNEIBLE, K. F. SCHREIER, AND BENJAMIN B. SCHNEIDER, AS TRUSTEES UNDER THE NAME OF THE SCHNEIBLE TRUST.

EVAPORATOR.

Application filed April 16, 1921. Serial No. 461,894.

*To all whom it may concern:*

Be it known that I, JOSEPH SCHNEIBLE, a citizen of the United States, residing at Chicago, in the county of Cook and State of Illinois, have invented a new and useful Improvement in Evaporators, of which the following is a specification.

The present invention relates to evaporators suitable for use under atmospheric pressure or under higher or lower pressures, or in single or multiple effect. It will be fully understood from the following description, illustrated by the accompanying drawing, in which a device embodying the invention is illustrated.

In the drawings:

Fig. 2 is a sectional view on the line 2 of Fig. 1, viewed in the direction of the arrow; and Fig. 3 is a sectional view on the line 3 of Fig. 1, viewed in the direction of the arrow.

Figure 1:
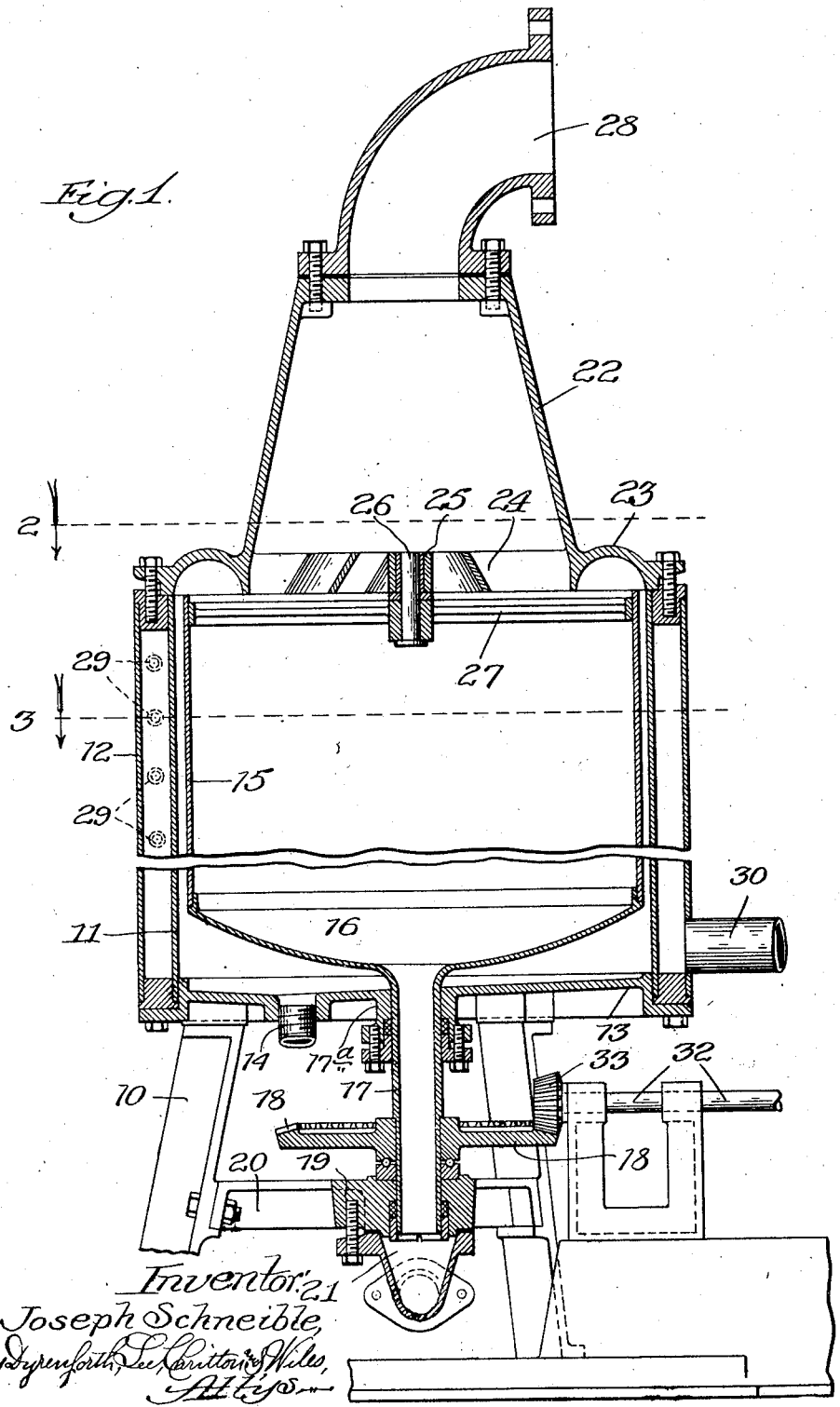
Fig. 1 is a vertical section through an evaporator, partially broken away.

Referring more particularly to the drawings, the numeral 10 indicates a standard on which is mounted a cylindrical casing 11 formed with a jacket 12, preferably also cylindrical in form, and with a closed bottom 13 having an outlet opening 14 to which it drains. Within the casing 11 is a rotatable cylindrical member 15, the bottom 16 of which is provided with a hollow depending trunnion 17 passing through a suitable stuffing box 17ª formed in the bottom 13 of the casing 11, the trunnion 17 having keyed to it a gear 18 by which it may be rotated. The end of the trunnion 17 passes through a suitable bearing 19 formed in a spider 20 mounted on the standard 10 and opens into an elbow or outlet connection 21. The cylindrical vessel 15 is open at its top.

The top of the casing 11 is closed by a cover having a vapor dome 22, and at its base a concave annular portion 23 overhanging the top of the cylindrical vessel 15 and adapted to turn the direction of movement of liquid passing upwardly between the interior of casing 11 and the exterior of the vessel 15 and direct it downwardly into the interior of vessel 15. Near the base of the dome 22 is provided a spider 24, preferably formed with spiral deflecting members, as best shown in Fig. 2, and a central bearing 25 which serves as a support for the shaft 26 upon which is journalled a spider 27 secured to the vessel 15. The spider 24 may suitably be cast integrally with the dome 22 and the annulus 23, as in the embodiment shown in the drawings. Any suitable vapor outlet, such as the elbow 28, may be provided from the dome 22.

In operation, any suitable heating medium, such as steam, is supplied in the jacket of the casing 11, preferably by means of the tangential inlet nozzles 29, which cause an active circulation of the steam in the jacket. An outlet for steam is provided at 30. The liquid to be vaporized or concentrated passes into the casing 11 through the opening 14, and is distributed between the outer wall of the vessel 15 and the inner wall of the casing 11. The vessel 15 is rotated, for example, by means of gear 33 mounted on guide 32 and meshing with the gear 18, thereby causing the thin sheet or layer of liquid between the vessel 15 and the casing 11 to move in a direction transverse to or across its general direction of travel. This relative movement of the liquid and the casing 11 improves its contact with the heating surface 11. The liquid rises up to the top of the casing, where it is diverted by the annular ring 23 downward into the interior of the casing 11. The vapor is released and passes out through the dome 22 and the outlet 28, entrained liquid being held back by the spiral vanes 24 in the dome. As the liquid travels downward to the interior of the casing 11 a further evaporation takes place. The residue or concentrated liquid passes out through the trunnion 17 and the outlet 21.

The device may be operated at atmospheric pressure, or if desired at diminished pressure or at a pressure over atmospheric. It may be employed in single effect, or in multiple effect, the vapors from one of a series being employed to heat liquid in a succeeding one of the series, the interior of which is at lower pressure. It may likewise be employed in steam distillation or steam treating processes, in which the liquid to be treated, together with the steam are forced into the annular space between the vessel 15 and the casing 11, the excess steam together with any vapor or gas accompanying it passing out through the vapor dome and outlet.

Altho the present invention has been described in connection with the specific details of an embodiment thereof, it is not intended that these details shall be regarded as limitations upon the scope of the invention, except in so far as included in the accompanying claims.

I claim:

1. In a device of the class described, a heated wall, a vessel within and spaced from the wall, said vessel having an open top providing its sole communication with the surrounding space, means for rotating said vessel, means for supplying a fluid in an upward direction between the vessel and the wall and means for diverting the upwardly moving fluid over the top of the vessel and into it.

2. In a device of the class described, a heated vertical cylindrical wall, a cylindrical vessel within said wall and spaced therefrom, said vessel having an open top providing its sole communication with the surrounding space, means for supplying fluid in an upward direction between the wall and the vessel, and means for diverting the upwardly moving fluid over the top of the vessel and into it.

3. In a device of the class described, a heated vertical cylindrical wall, a bottom closure therefor having an inlet, a cylindrical vessel within said wall and spaced therefrom, said vessel having an open top providing its sole communication with the surrounding space and a depending hollow trunnion passing through the bottom closure for the wall, means for diverting liquid passing upwardly between the wall and the vessel into the vessel and means for withdrawing vapor from within the wall and the vessel.

4. In a device of the class described, a heated cylindrical container having an inlet in its bottom, a cylindrical vessel within the container and spaced therefrom, said vessel having an open top providing its sole communication with the surrounding space and a depending hollow trunnion passing through the bottom of the said container, means for rotating said vessel, and a cover for the container, said cover being provided with a vapor outlet and means for diverting liquid passing upwardly between the vessel and the container wall.

5. In a device of the class described, a jacketed cylindrical container having an inlet in its bottom, means for introducing a heating fluid into the jacket thereof, a cylindrical open-topped vessel within the container and spaced therefrom, said vessel having a depending hollow trunnion serving as an outlet and passing through the bottom of the said container, means for rotating the vessel, and a cover for the container, said cover being provided with a vapor dome and a surrounding concave annulus, the latter being disposed to divert liquid passing upwardly between the vessel and the container wall into the vessel.

JOSEPH SCHNEIBLE.